United States Patent [19]
Dannoue et al.

[11] Patent Number: 6,008,345
[45] Date of Patent: Dec. 28, 1999

[54] PROCESS FOR MAKING POLYCARBOXYLIC ACID DERIVED FROM POLYSACCHARIDE COMPOSED OF ANHYDROUS GLUCOSE UNITS AND SALTS THEREOF

[75] Inventors: Yukihiro Dannoue; Kiyoshi Morohara; Kiyoshi Nakayama, all of Tokyo, Japan

[73] Assignee: Lion Corporation, Japan

[21] Appl. No.: 08/981,304

[22] PCT Filed: Jun. 28, 1996

[86] PCT No.: PCT/JP96/01809

§ 371 Date: Dec. 16, 1997

§ 102(e) Date: Dec. 16, 1997

[87] PCT Pub. No.: WO97/02293

PCT Pub. Date: Jan. 23, 1997

[30] Foreign Application Priority Data

Jun. 30, 1995 [JP] Japan .................................. 7-188612

[51] Int. Cl.$^6$ ..................................................... C07H 1/00
[52] U.S. Cl. ......................... 536/124; 536/105; 536/110; 536/119; 536/128
[58] Field of Search ................................. 536/124, 128, 536/119, 110, 105

[56] References Cited

U.S. PATENT DOCUMENTS

| | | | |
|---|---|---|---|
| 3,873,614 | 3/1975 | Lamberti et al. | 536/124 |
| 4,056,400 | 11/1977 | Diamantoglou et al. | 106/162 |
| 4,985,553 | 1/1991 | Fuertes et al. | 536/124 |
| 5,326,864 | 7/1994 | Besemer et al. | 536/123.1 |
| 5,417,755 | 5/1995 | Suc et al. | 106/210 |

FOREIGN PATENT DOCUMENTS

| | | |
|---|---|---|
| 0427349 | 5/1991 | European Pat. Off. . |
| 0472042 | 2/1992 | European Pat. Off. . |
| 60-226502 | 4/1984 | Japan . |
| 62-247837 | 1/1987 | Japan . |
| 9405762 | 3/1994 | WIPO . |
| 9601809 | 8/1996 | WIPO . |
| 9702293 | 1/1997 | WIPO . |

*Primary Examiner*—L. Eric Crane
*Attorney, Agent, or Firm*—Lorusso & Loud

[57] ABSTRACT

There is described a polycarboxylic acid or a salt thereof obtained by oxidation of a polysaccharide containing an anhydrous glucose as a constituent unit, wherein the carboxyl group content thereof is high and the weight average molecular weight thereof is not less than 2000. This polycarboxylic acid is suitable for use as a builder for detergent because the amount of an alkali required to perform neutralization titration of the polycarboxylic acid is not less than 435 mg in terms of sodium hydroxide and because the chelate force thereof to a polyvalent cation is high.

The polycarboxylic acid is produced by oxidizing a polysaccharide with an oxidizing agent in the presence of a transition metal catalyst.

2 Claims, No Drawings

6,008,345

PROCESS FOR MAKING POLYCARBOXYLIC ACID DERIVED FROM POLYSACCHARIDE COMPOSED OF ANHYDROUS GLUCOSE UNITS AND SALTS THEREOF

This application is a 371 of PCT/JP96/01809, filed June 28, 1996, now abandoned.

TECHNICAL FIELD

The present invention relates to a polycarboxylic acid or a salt thereof produced by oxidation of a polysaccharide containing an anhydrous glucose as a constituent unit and to a method of producing same.

BACKGROUND ART

Polycarboxylic acids such as polyacrylic acid, copolymer of acrylic acid and maleic acid, etc. are used as is a dispersant, a chelating agent or a flocculant. It is generally known that, when these polycarboxylic acids are used as the chelating agent, the effect is influenced by the content of carboxyl groups and molecular weight and, furthermore, the larger the content of carboxyl groups and molecular weight, the better the effect to be exerted. When a chelating capacity of these polycarboxylic acids is measured by the method shown in the Examples described hereinafter, the polyacrylic acid exhibits a Ca ion sequestration capacity of about 300 mg/g. The copolymer of acrylic acid and maleic acid exhibits a Ca ion sequestration capacity of about 370 mg/g.

However, it is also well known that it is very hard to perform biodegradation of the polycarboxylic acid obtained by polymerizing a monomer having a vinyl group, such as polyacrylic acid, copolymer of acrylic acid and maleic acid, etc., using microorganisms. Therefore, for the purpose of obtaining a chelating agent which is useful as a builder for detergent, there has been made a trial of oxidizing polysaccharides as a natural polymer to obtain a polycarboxylic acid whose biodegradation is expected, or a salt thereof, heretofore.

JP-B-49-1281 discloses that a polycarboxylic acid is obtained from various polysaccharides by a two-stage oxidation method using periodic acid and chlorite or a single-stage oxidation method using a hypochlorite. However, an amount of carboxyl groups in the polycarboxylic acid obtained by the method disclosed in this gazette does not exceed two on average per monosaccharide unit, excluding a special example. As the special example wherein the content of carboxyl groups exceeds 2 per monosaccharide unit, Example 78 discloses the example of previously producing a monocarboxylated corn starch and further oxidizing the monocarboxylated corn starch and Examples 79 and 80 disclose the example using sodium arginate as polysaccharides. However, in these Examples, there is no description about the molecular weight of the resulting polycarboxylic acid and, therefore, these Examples do not suggest a polycarboxylic acid having a structure wherein both content of carboxyl groups and molecular weight are clearly defined. In the production method described in these Examples, a large amount of acetic acid is used when the formed dialdehyde derivative is oxidized with sodium hypochlorite to form a dicarboxylic acid. However, it is well known that, under these acidic conditions, polysaccharides are hydrolyzed and the molecular weight is drastically lowered. Besides, this method has a problem that the production process becomes complicated because the monocarboxylated starch is once produced and further oxidized. On the other hand, when arginic acid is used as a raw material, the method has an economical problem. JP-A-60-226502 discloses a method of oxidizing polysaccharides using a hypochlorite as an oxidizing agent under controlled reaction conditions to obtain a polycarboxylic acid. The polycarboxylic acid obtained by this method has sufficiently high molecular weight, but the content of the carboxyl unit is 81% at most and the content of carboxyl groups is less than 2 on average per monosaccharide unit. Therefore, it is not a polycarboxylic acid having a structure which simultaneously satisfies the content of carboxyl groups and the molecular weight.

JP-A-62-247837 discloses a method of oxidizing polysaccharides using a metal catalyst such as Pd in combination with an accelerator such as Bi to obtain a polycarboxylic acid. However, this method is characterized by oxidizing the reducing terminal end of polysaccharides and the content of carboxyl groups does not also exceed 2 on average per monosaccharide unit.

JP-A-4-175301 discloses a method of oxidizing polysaccharides in the presence of a hypobromite or a hypoiodite. This gazette does not disclose data which suggest the structure of a polycarboxylic acid as a product. However, since there is a description "it is understood in this specification that the term 'dicarboxy polysaccharides or polycarboxy saccharides' used herein mean polysaccharides wherein almost all of C2–C3 diol functional groups are respectively converted into two carboxyl groups by means of ring opening" in the specification, the amount of carboxyl groups contained in the polycarboxylic acid of this gazette is considered to be 2 at most as an average value per monosaccharide unit.

JP-A-4-233901 discloses a method of oxidizing an enzyme hydrolysate of starch or dextrin with a hypochlorite or a periodate. In this gazette, there is no description about a structure of a polycarboxylic acid obtained after the oxidation reaction, particularly content of carboxyl groups. Also, a clear measurement example about the molecular weight is not disclosed. Even if the molecular weight is calculated based on a distribution of a glucoside unit disclosed in Example 5 assuming that a decrease in molecular weight does not arise at the time of the following oxidation reaction and three carboxyl groups are introduced per unit after the maximum reaction, a weight-average molecular weight is 915 at most. When using, as a raw material, starch or dextrin from which a higher molecular weight material may be obtained, as shown in Comparative Example 1, a Ca ion sequestration capacity of the resulting polycarboxylic acid is still low, e.g. 200 and 225, which shows that the content of carboxyl groups in the oxidation reaction product is low.

JP-A-08-500626 discloses a method of oxidizing potato starch suspended in carbon tetrachloride with dinitrogen tetraoxide, followed by oxidation with oxygen. The carboxyl group content of the polycarboxylic acid obtained by this method is very low, e.g. about 1 in average number of carboxyl groups per glucose unit.

As described above, those wherein the content of carboxyl groups exceeds 2 per anhydrous glucose unit and the weight-average molecular weight is not less than 2000 are not known with respect to a polycarboxylic acid obtained by oxidizing polysaccharides containing an anhydrous glucose as a constituent unit, or a salt thereof.

DISCLOSURE OF THE INVENTION

The object of the present invention of the present invention is to provide a method of producing a polycarboxylic acid or a salt thereof having a high carboxylic group content and a large molecular weight from polysaccharides containing an anhydrous glucose as a constituent unit, and a polycarboxylic acid or a salt thereof obtained by the method.

The present inventors have intensively studied to solve the above problems. As a result, the present invention has been accomplished.

That is, according to the present invention, there is provided a polycarboxylic acid or a salt thereof derived from polysaccharides containing an anhydrous glucose as a constituent unit, characterized in that the amount of an alkali required to perform neutralization titration of an acid type polycarboxylic acid is not less than 435 mg in terms of sodium hydroxide per 1 g of said polycarboxylic acid and the weight-average molecular weight of said polycarboxylic acid is not less than 2000.

According to the present invention, there is also provided a method for producing a polycarboxylic acid or a salt thereof, wherein the amount of an alkali required to perform neutralization titration of an acid type polycarboxylic acid is not less than 435 mg in terms of sodium hydroxide per 1 g of the polycarboxylic acid and the weight average molecular weight of said polycarboxylic acid is not less than 2000, characterized in that a polysaccharide containing an anhydrous glucose as a constituent unit is oxidized in the presence of a transition metal catalyst using an oxidizing agent.

Since the structure of the polycarboxylic acid of the present invention is complicated, it is difficult to show a clear structural formula. The polycarboxylic acid obtained by using starch as a raw material is represented by following general formula (1) and, assuming by means of an amount of sodium hydroxide required to neutralization titration, it can be said to be a polycarboxylic acid having at least 2.1 carboxyl groups on average per anhydrous glucose unit.

with a cation exchange resin described hereinafter. The method of determining the molecular weight is carried out using the GPC method using a standard polyacrylic acid as described hereinafter.

The polysaccharides used for obtaining the polycarboxylic acid of the present invention or salt thereof may be any polysaccharides containing an anhydrous glucose as a constituent unit, and are not specifically limited. Examples thereof include starch, dextrin, cellulose or a hydrolysate thereof, or amylose or amylopectin obtained by fractionating starch. These polysaccharides are used in combination thereof. Also, an origin of these polysaccharides is not specifically limited. In case of starch, for example, corn starch, wheat starch, rice starch, tapioca starch, etc. may be used. In case of cellulose, for example, cellulose obtained from conifer tree, broad leaf tree, cotton, etc. may be used. Among these polysaccharides, starch or cellulose is preferably used in view of the availability or economical efficiency. Particularly preferable one is starch.

The polycarboxylic acid of the present invention or salt thereof is obtained by oxidizing polysaccharides containing an anhydrous glucose using a combination of a specific catalyst and a specific oxidizing agent. That is, the polycarboxylic acid or salt thereof can be produced by adding an oxidizing agent with maintaining the pH of the solution within a fixed range.

Examples of the transition metal catalyst used in the present invention are Ru, Os, Rh, Ir, Pt, Pd, etc., preferably ruthenium catalyst or osmium catalyst. These transition metal catalysts may be used in the form of salts such as chloride, sulfide, oxide, etc. or used as they are or after carrying them with carriers such as carbon, alumina, etc. An amount of these metal catalysts used is from 0.05 to 10% by mol, preferably from 0.1 to 7% by mol, more preferably from 0.5 to 5% by mol, per anhydrous glucose unit of polysaccharides.

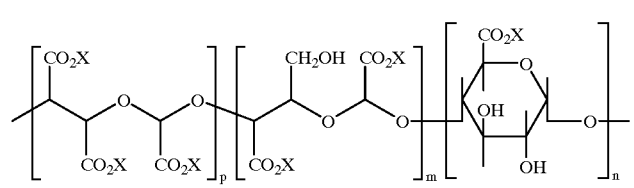

(I)

wherein X is H or a salt-forming cation and $(3P+2m+n)/(1+m+n)$ is from 2.1 to 3.0.

The reason is as follows. That is, in case of a polycarboxylic acid having two carboxylic groups per anhydrous glucose, wherein a c2–C3 bond of an anhydrous glucose is formed by oxidation ring opening (i.e. dicarboxyl polysaccharide of the above structural formula wherein P is 0 and n is 0), the amount of sodium hydroxide required to neutralization titration is 417 mg at most per 1 g of an acid type polycarboxylic acid.

In the salt of the polycarboxylic acid of the present invention, examples of the salt include salts of alkaline metals such as Na, K, Li, etc. and salts of amines such as ammonia, alkylamine, alkanolamine, etc. Among them, Na salt or K salt is preferable in view of ease of producing. A part of carboxyl groups may be converted into a salt.

In the present invention, as the method of determining the content of carboxyl groups, a neutralization titration method can be used as described above. When an acid type polycarboxylic acid must be obtained in case of the neutralization titration, it is carried out by using the method of treating Examples of the oxidizing agent used in the present invention include hypohalite (e.g. Na salt, K salt, Ca salt, Mg salt, etc.), bleaching powder, perhalite, persulfate, peracetate and the like. Preferably, bleaching powder or hypohalite is used and use of hypohalite is particularly preferable. An amount of these oxidizing agents used varies depending on the content of carboxyl groups in the polycarboxylic acid to be finally obtained, but is normally from 3 to 12 mol, preferably from 4 to 9 mol, per mol of an anhydrous glucose unit of polysaccharides. The reaction is performed by adding these oxidizing agents into a dispersion of polysaccharides and a transition metal catalyst in water. A method of adding the oxidizing agent is not specifically limited, but the oxidizing agent is normally added continuously or added by several portions. The reaction time is not specifically limited, but is normally from 2 to 24 hours, preferably from 3 to 18 hours. The reaction temperature is not specifically limited, but is normally from 5 to 50° C., preferably from 10 to 40° C.

The pH of the solution during the reaction is maintained within the range from 6 to 13, preferably from 7 to 12.

Adjustment of the pH can be performed by using hydroxides of alkaline metals, such as sodium hydroxide, potassium hydroxide, lithium hydroxide, etc.; or amines such as ammonia, alkylamine, alkanolamine, etc. Preferably, sodium hydroxide or potassium hydroxide is used.

Under the above reaction conditions, cleavage of a glucoside bond of a backbone chain of polysaccharides does not arise, comparatively easily, and a hydroxyl group of polysaccharides is oxidized in good efficiency. Therefore, it is possible to obtain a desired polycarboxylic acid wherein an amount of sodium hydroxide required to perform neutralization titration of an acid type polycarboxylic acid is not less than 435 mg per 1 g of the polycarboxylic acid and a weight-average molecular weight is not less than 2000, or a salt thereof. The upper limit of the molecular weight of the polycarboxylic acid is about 50000 in weight-average molecular weight. This polycarboxylic acid or salt thereof is suitably used as a builder for detergent or a scum inhibitor because a chelate force to a polyvalent cation such as Ca, Mg, etc. is high as a result of high molecular weight and high content of carboxyl groups.

In the polycarboxylic acid produced by the oxidation of polysaccharides of the present invention, the amount of neutralization titration using sodium hydroxide (NaOH) and molecular weight vary depending on the kind of raw polysaccharides used, kind of an oxidizing agent, kind of a catalyst and reaction conditions. In case of the present invention, the amount of neutralization titration is not less than 435 mg/g, particularly from 486 to 582 mg/g, and the molecular weight is not less than 2000, preferably from 2,500 to 15,000, in weight-average molecular weight. In the present invention, it is particularly preferable that the polycarboxylic acid is produced by oxidizing starch as the raw polysaccharides with a hypochlorite or a bleaching powder in the presence of a ruthenium catalyst.

In the present invention, the oxidation reaction product obtained by the above oxidation reaction is preferably treated with a reducing agent. A color tone of the oxidation reaction product can be improved by this treatment using the reducing agent. The oxidation reaction product shows a black or brown color and is inferior in color tone, but the color tone can be improved to form a color tone (e.g. blue color, yellow color, etc.) by subjecting to a reducing agent treatment.

The reducing agent may be any one whose redox potential is lower than that of the oxidizing agent used, and preferable examples thereof include sulfite (e.g. sodium salt, potassium salt, ammonium salt, etc.), ditionite (e.g. sodium salt, potassium salt, ammonium salt, etc.) and hydrogen peroxide. An amount of these reducing agent used varies depending on the amount of the oxidizing agent remained in the reaction system after the completion of the oxidation reaction, but is generally from 0.3 to 10 mol, preferably from 0.5 to 5 mol, per mol of the residual oxidizing agent.

Next, the method for the measurement of the neutralization titration amount (hereinafter referred to as "carboxyl group content A", sometimes) and molecular weight in the polycarboxylic acid will be described.

[Measurement of carboxyl group content A]

After precisely weighing about 0.2 g (absolute dry weight) of an acid type polycarboxylic acid, the acid type polycarboxylic acid is charged in a conical beaker having a volume of 200 ml and about 50 ml of deionized water is added to dissolve the acid type polycarboxylic acid. Using phenolphthalein as an indicator and a 1/10 N standard sodium hydroxide solution, titration of the resulting solution is performed and a carboxyl group content A is indicated as an amount (mg) of sodium hydroxide required to neutralize 1 g of the acid type polycarboxylic acid.

When it is apparent that a part or all of the polycarboxylic acid whose carboxyl group content A is measured is in the form of a salt, the polycarboxylic acid is converted into an acid type polycarboxylic acid by the following method. That is, it is converted into the acid type polycarboxylic acid by preparing an aqueous solution (about 1% by weight) of the polycarboxylic acid, passing the aqueous solution through a column packed with a cation exchanged resin (DOWEX 50W-X8), followed by cation exchange. The cation exchange resin is used in an amount of 10 ml per 1 g of an aqueous solution (1% by weight) of the polycarboxylate. The acid type polycarboxylic acid can be obtained in the form of a powder by freeze-drying the eluent or drying it under reduced pressure (40° C. or less).

[Measurement of molecular weight by means of GPC]

About 5 mg of the same polycarboxylic acid powder as that used in the neutralization titration is dissolved in 5 ml of a phosphate buffer solution (pH 7, concentration: 0.1 mol/liter) containing NaCl having a concentration of 0.3 mol/liter and the molecular weight is determined by means of GPC under the following conditions and was indicated by the weight-average molecular weight.

Column to be used: manufactured by Toso Co., Ltd., G-4000PW+G-2500PW

Eluent: phosphate buffer (concentration: 0.1 mol/liter) containing NaCl having a concentration of 0.3 mol/liter, pH7

Elution rate: 0.5 ml/min.

Column temperature: 40° C.

Amount of sample to be charged: 200 $\mu$l

Calibration curve: standard Na polyacrylate manufactured by Polyscience Co. (weight-average molecular weight: 2100, 5000, 20000, 35000 and 165300) was used.

EXAMPLES

The following Examples will further illustrate the present invention in detail. In the followings, percentages are by weight unless otherwise stated.

Example 1

In a separable flask (volume: 500 ml) equipped with a stirrer, a dropping funnel for oxidizing agent, a dropping inlet for aqueous sodium hydroxide solution, a pH electrode and a thermometer, 10 g (absolute dry weight) of corn starch, 100 g of deionized water and 0.49 g (3% by mol per anhydrous glucose unit of starch) of $RuCl_3 \cdot nH_2O$ (Ru content: 38% by weight) were charged after weighing. The mixture was cooled with a water bath of 20° C. and, at the time when the inner temperature reaches about 20° C., 230 g (6 mol per mol of an anhydrous glucose unit) of an aqueous solution (12 % by weight) of Na hypochlorite was added over 3 hours. During the addition, an aqueous 2 N sodium hydroxide solution was added using a pH-stat to control the pH in the system to 9.

After the completion of the addition of Na hypochlorite, stirring was continued for additional two hours, the reaction mixed solution was slowly poured into about 1 liter of ethanol to precipitate the reaction product. The resulting precipitate was dissolved in 150 ml of deionized water, purified by subjecting to diffusion dialysis using deionized water for 5 days and then freeze-dried to obtain 7.5 g of a powder of Na polycarboxylate.

With respect to the resulting Na polycarboxylate, the carboxyl group content A obtained by the above method was 521 mg and the weight-average molecular weight was 5800.

A Ca ion sequestration capacity (CEC) determined by the following method was 410 mg/g.

[Measurement of Ca ion sequestration capacity (CEC)]

A Ca solution having a concentration of 100 ppm in terms of $CaCO_3$ was prepared by diluting a standard $CaCl_2$ solution having a concentration of 0.1 mol/liter (manufactured by Orion Research Co.) in a dilution of 100. On the other hand, the polycarboxylic acid to be tested was dissolved in deionized water to prepare an aqueous solution wherein a concentration of Na polycarboxylate is precisely 1% by weight, which was taken as a test solution.

After weighing 100 ml of the Ca solution, 2 ml of a KCl solution having a concentration of 4 mol/liter was added and the pH of the solution was adjusted to 10 by using 1/10 N NaOH. An initial concentration of the Ca ion was measured with stirring this aqueous solution using a Ca ion electrode. After 2 ml of the test solution was precisely added and the pH was adjusted again to 10, a Ca ion concentration was measured by using a Ca ion electrode. The amount obtained by subtracting the Ca ion concentration after the addition of the test solution from the initial concentration of the Ca ion was indicated as an amount of Ca ion chelated. The amount of the Ca ion chelated by 1 g of Na polycarboxylate was indicated as an amount (mg) of $CaCo_3$.

Example 2

In the same separable flask (volume: 500 ml) as that shown in Example 1, 10 g (absolute dry weight) of corn starch, 50 g of deionized water and 0.16 g (1% by mol per anhydrous glucose unit of starch) of $RuCl_3 \cdot nH_2O$ (Ru content: 38% by weight) were charged after weighing. The mixture was cooled with a water bath of 20° C. and, at the time when the inner temperature reaches about 20° C., 192 g (5 mol per mol of an anhydrous glucose unit) of an aqueous Na hypochlorite solution (12% by weight) was added over 5 hours. During the addition, an aqueous 2 N sodium hydroxide solution was added using a pH-stat to control the pH in the system to 10.

After the completion of the addition of Na hypochlorite, stirring was continued for additional two hours and then 7.8 g of Na polycarboxylate was obtained according to the same manner as that described in Example 1.

The carboxyl group content A in the resulting Na polycarboxylate was 489 mg, the weight-average molecular weight was 8100, and CEC was 402 mg/g.

Comparative Example 1

3 g of Na polycarboxylate obtained in Example 2 was dissolved in 50 g of deionized water and, after the pH was adjusted to 3.0 by using 1 N hydrochloric acid, the solution was hydrolyzed with heating in a hot water bath at 80° C. under stirring using a magnetic stirrer for 2 hours. After cooling to room temperature, the pH was adjusted to 10 by using 1 N NaOH and the resultant was poured into 500 ml of ethanol. The resulting precipitate was dissolved in 30 ml of deionized water, subjected to diffusion dialysis using deionized water for 5 day and then freeze-dried to obtain 1.1 g of hydrolyzed Na polycarbonate.

The carboxyl group content A in this hydrolyzed Na polycarboxylate was 486 mg, but the weight-average molecular weight is reduced to 1200 and CEC was also reduced to 280 mg/g.

Example 3

According to the same manner as that in Example 1 except for using 0.47 g (3% by mol per an anhydrous glucose unit of starch) of osmium tetraoxide in place of $RuCl_3 \cdot nH_2O$ (Ru content: 38% by weight), 6.8 g of Na polycarboxylate was obtained. The carboxyl group content A of the resulting Na polycarboxylate was 458 mg and the weight-average molecular weight was 4200. CEC was 340 mg/g.

Example 4

According to the same manner as that in Example 1 except for using 10 g a cellulose powder (reagent) in place of corn starch, 8.2 g of Na polycarboxylate was obtained. The carboxyl group content A of the resulting Na polycarboxylate was 440 mg and the weight-average molecular weight was 6200. CEC was 365 mg/g.

Examples 5 to 9

According to the same manner as that described in Example 1 except for varying the reaction conditions such as, kind of polysaccharides, kind of a catalyst, amount of Na hypochlorite (NaClO) and pH during the reaction, Na polycarboxylate was obtained, respectively.

The Ru content of a carbon-carrying Ru shown in Table 1 is 5% by weight, and each of the amount of the catalyst and amount of NaClO used is an amount per anhydrous glucose unit of polysaccharides.

TABLE 1

| | Item | Example 5 | Example 6 | Example 7 | Example 8 | Example 9 |
|---|---|---|---|---|---|---|
| Reaction conditions | Kind of polysaccharides | Corn starch | Wheat starch | Amylopectin | Corn starch | Corn starch |
| | Kind of catalyst | $RuCl_3$ | $RuCl_3$ | Carbon-carrying Ru | $RuCl_3$ | $RuO_2$ |
| | Catalyst amount (% by mol) | 5 | 7 | 1 | 0.5 | 0.5 |
| | NaClO (mol) | 6 | 9 | 6 | 5 | 5 |
| | pH | 11 | 10 | 8 | 7 | 9 |
| | Temperature (° C.) | 20 | 20 | 20 | 30 | 20 |
| | Yield (g) | 7.8 | 7.4 | 8.3 | 8.1 | 7.9 |
| Property | Carboxyl | 551 | 558 | 514 | 488 | 451 |

TABLE 1-continued

| Item | | Example 5 | Example 6 | Example 7 | Example 8 | Example 9 |
|---|---|---|---|---|---|---|
| | group content A (mg) | | | | | |
| | Weight-average molecular weight | 4300 | 2800 | 6200 | 3800 | 12500 |
| Performance | CEC (mgCaCO$_3$/g) | 425 | 408 | 412 | 397 | 389 |

Example 10

In the same separable flask (volume: 500 ml) as that shown in Example 1, 10 g (absolute dry weight) of corn starch and 90 g of deionized water were charged.

Thereafter, the separable flask was put in a constant temperature bath at 20° C. and corn starch was dispersed by stirring. Then, 0.49 g (3% by mol per an anhydrous glucose unit of starch) of RuCl$_3$·nH$_2$O (Ru content: 38% by weight) was added, followed by stirring. At the time when the inner temperature reaches about 20° C., 213 g (6 mol per mol of an anhydrous glucose unit) of an aqueous Na hypochlorite solution (13% by weight) was added dropwise for 6 hours, continuously. During the dropwise addition, an aqueous 2 N sodium hydroxide solution was added dropwise using a pH-stat to control the pH in the system to 8.

After the completion of the dropwise addition of the aqueous sodium hypochlorite solution, the concentration of the residual sodium hypochlorite was measured. As a result, it was 1% by weight. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 μm), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 7.2 g of a powder of sodium polycarboxylate.

The carboxyl group content A of the resulting sodium polycarboxylate was 500 mg and the weight-average molecular weight was 4000. The color tone was pale blue. According to the same manner as that described in the above test except for using no sodium sulfite, 7.5 g of a powder of sodium polycarboxylate was obtained. The carboxyl group content A of the obtained by the above method was 500 mg and the weight-average molecular weight was 4000. The color tone of the powder was black.

Example 11

The same manner as that described in Example 10 was repeated, except that the amount of sodium sulfite was changed. The results are shown in Table 2.

TABLE 2

| Sodium sulfite (mol per mol of oxidizing agent) | 0.5 | 2 | 5 |
|---|---|---|---|
| Carboxyl group content A (mg) | 500 | 500 | 500 |
| Weight-average molecular weight | 4000 | 4000 | 4000 |
| Color tone of powder | Bluish green | Nearly colorless | Nearly colorless |

Example 12

According to the same manner as that described in Example 10 except for changing the amount of RuCl$_3$·nH$_2$O (Ru content: 38% by weight) to 0.05 g (0.3% by mol per anhydrous glucose unit of starch), the reaction was performed.

After the completion of the dropwise addition of the aqueous sodium hypochlorite solution, the concentration of the residual sodium hypochlorite was 1.3%. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 μm), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 5.2 g of a powder of sodium polycarboxylate.

The carboxyl group content A of the resulting sodium polycarboxylate was 450 mg and the weight-average molecular weight was 2500. The color tone was pale yellow.

Example 13

According to the same manner as that described in Example 10 except for changing the amount of RuCl$_3$·nH$_2$O (Ru content: 38% by weight) to 1.6 g (10% by mol per anhydrous glucose unit of starch), the reaction was performed.

After the completion of the dropwise addition of the aqueous sodium hypochlorite solution, the concentration of the residual sodium hypochlorite was 1.2%. Then, sodium sulfite was added in a two-fold molar amount based on the residual sodium hypochlorite and then dissolved by stirring.

After the dissolution, the solution was allowed to stand to form a precipitate. After the formed precipitate was removed by filtration (pore diameter of filter: 0.1 μm), the resulting precipitate was purified by using an ultrafiltration device and then freeze-dried to obtain 5.2 g of a powder of sodium polycarboxylate.

The carboxyl group content A of the resulting sodium polycarboxylate was 520 mg and the weight-average molecular weight was 4000. The color tone was pale blue.

Example 14

In the same separable flask (volume: 500 ml) as that shown in Example 1, 10 g (absolute dry weight) of corn starch and 90 g of deionized water were charged.

Thereafter, the separable flask was put in a constant temperature bath at 20° C. and corn starch was dispersed by stirring. Then, 0.16 g (1% by mol per an anhydrous glucose unit of starch) of $RuCl_3 \cdot nH_2O$ (Ru content: 38% by weight) was added, followed by stirring. At the time when the inner temperature reaches about 20° C., 213 g (6 mol per mol of an anhydrous glucose unit) of an aqueous Na hypochlorite solution (13% by weight) was added dropwise for 3 hours, continuously. During the dropwise addition, an aqueous 2 N sodium hydroxide solution was added dropwise using a pH-stat to control the pH in the system to 10.

After the completion of the dropwise addition of the aqueous sodium hypochlorite solution, the concentration of the residual sodium hypochlorite was measured. As a result, it was 0.5% by weight. Then, a reducing agent shown in Table 3 was added in a five-fold molar amount based on the residual sodium hypochlorite and then dissolved by stirring. After the dissolution, the solution was allowed to stand to form a precipitate. After the formed precipitate was removed by filtration (pore diameter of filter: 0.1 μm), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain a powder of sodium polycarboxylate. The results are shown in Table 3.

TABLE 3

| Reducing agent | Sodium sulfite | Na dithionite (Hydrosulfite) |
| --- | --- | --- |
| Carboxyl group content A (mg) | 460 | 460 |
| Weight-average molecular weight | 3000 | 3000 |
| Color tone of powder | Pale blue | Pale yellow |

Example 15

According to the same manner as that described in Example 10 except for changing the reaction conditions as shown in Table 4, the reaction was performed. After the completion of the dropwise addition of an aqueous sodium hypochlorite solution, the amount of the residual sodium hypochlorite was measured and then a sodium sulfite was added in an amount of 2 mol per mol of the residual sodium hypochlorite. The results are shown in Table 4.

TABLE 4

| Test No. | 1 | 2 | 3 | 4 | 5 | 6 | 7 | 8 |
| --- | --- | --- | --- | --- | --- | --- | --- | --- |
| Kind of polysaccharides | Corn starch | Tapioca starch | Potato starch | Wheat starch | Soluble starch | Amylopectin | Cellulose powder | Corn starch |
| Kind of catalyst | $RuCl_3$ | $RuCl_3$ | $RuCl_3$ | $RuCl_3$ | $RuCl_3$ | Carbon-carrying Ru | $RuCl_3$ | None |
| Catalyst amount (% by mol)* | 3 | 3 | 5 | 1 | 3 | 0.5 | 3 | 0 |
| Sodium hypochlorite amount (mol)** | 3 | 6 | 6 | 12 | 5 | 6 | 6 | 6 |
| Time of sodium hypochlorite to be added (hour) | 3 | 6 | 18 | 6 | 5 | 1.5 | 3 | 3 |
| Reaction temperature (° C.) | 20 | 20 | 20 | 40 | 5 | 20 | 20 | 20 |
| Reaction pH | 9 | 12 | 6 | 9 | 8 | 8 | 10 | 9 |
| Carboxyl group content A (mg) | 513 | 517 | 537 | 517 | 501 | 450 | 460 | 312 |
| Weight-average molecular weight | 3300 | 4200 | 6600 | 2700 | 3500 | 3600 | 5500 | 5000 |
| Color tone of powder | Pale blue | Pale blue | Pale yellow | Pale blue | Pale blue | Pale yellow | Pale blue | Colorless |

*per anhydrous glucose unit
**per mol of anhydrous glucose unit

Example 16

According to the same manner as that in Example 10 except for using 0.47 g (3% by mol per an anhydrous glucose unit of starch) of osmium tetraoxide in place of $RuCl_3 \cdot nH_2O$, 6 g of sodium polycarboxylate was obtained. The carboxyl group content A of the resulting sodium polycarboxylate was 450 mg. The weight-average molecular weight was 3800 and the color tone of the powder was pale yellow.

EFFECT OF THE INVENTION

According to the present invention, there can be obtained a polycarboxylic acid having high carboxyl group content and high molecular weight, or a salt thereof, in good yield.

The polycarboxylic acid of the present invention or salt thereof can be used as a dispersant, a chelating agent or a flocculant. Since the carboxyl group content is high and a chelate force to a polyhydric cation such as Ca, Mg, etc. is large, the polycarboxylic acid or salt thereof is particularly suitable as a builder for detergent or a scum inhibitor.

We claim:

1. A method for producing a polycarboxylic acid or a salt thereof, wherein the polycarboxylic acid contains, in its acid form, carboxylic acid groups in a number requiring an amount of alkali for neutralization of its acid form not less than 435 mg in terms of sodium hydroxide per 1 g of the polycarboxylic acid and the weight-average molecular weight of said polycarboxylic acid is not less than 2000, comprising oxidizing a polysaccharide containing anhydrous glucose as a constituent unit in the presence of a transition metal catalyst, using an oxidizing agent selected from the group consisting of hypohalites, bleaching powder, perhalites, persulfates and peracetates, said transition metal catalyst containing at least one member selected from the group consisting of Ru, Os, Tr, Pt, Pd and oxides and salts thereof.

2. A method according to claim 1 wherein said transition metal catalyst contains at least one member selected from the group consisting of Ru and Os and oxides and salts thereof.

* * * * *

UNITED STATES PATENT AND TRADEMARK OFFICE
CERTIFICATE OF CORRECTION

PATENT NO. : 6,008,345
DATED : December 28, 1999
INVENTOR(S) : Yukihiro Dannoue et al.

It is certified that error appears in the above-identified patent and that said Letters Patent is hereby corrected as shown below:

Please delete the specification and claims in columns 1-14, and substitute the new specification and claims in columns 1-12, as shown on the attached pages.

Signed and Sealed this

Thirtieth Day of March, 2004

JON W. DUDAS
*Acting Director of the United States Patent and Trademark Office*

PROCESS FOR MAKING POLYCARBOXYLIC ACID DERIVED FROM POLYSACCHARIDE COMPOSED OF ANHYDROUS GLUCOSE UNITS AND SALTS THEREOF

TECHNICAL FIELD

The present invention relates to a polycarboxylic acid or a salt thereof produced by oxidation of a polysaccharide containing an anhydrous glucose as a constituent unit and to a method of producing same.

BACKGROUND ART

Polycarboxylic acids such as polyacrylic acid, copolymer of acrylic acid and maleic acid, etc. are used as a dispersant, a chelating agent or a flocculant. It is generally known that, when these polycarboxylic acids are used as the chelating agent, the effect is influenced by the content of carboxyl groups and molecular weight and, furthermore, the larger the content of carboxyl groups and molecular weight, the better the effect to be exerted. When a chelating capacity of these polycarboxylic acids is measured by the method shown in the Examples described hereinafter, the polyacrylic acid exhibits a Ca ion sequestration capacity of about 300 mg/g. The copolymer of acrylic acid and maleic acid exhibits a Ca ion sequestration capacity of about 370 mg/g.

However, it is also well known that it is very hard to perform biodegradation of the polycarboxylic acid obtained by polymerizing a monomer having a vinyl group, such as polyacrylic acid, copolymer of acrylic acid and maleic acid, etc., using microorganisms Therefore, for the purpose of obtaining a chelating agent which is useful as a builder for detergent, an attempt has been made to oxidize polysaccharides, natural polymers, to obtain a polycarboxylic acid whose biodegradation is expected, or a salt thereof.

JP-B-49-1281 discloses that a polycarboxylic acid is obtained from various polysaccharides by a two-stage oxidation method using periodic acid and chlorite or a single-stage oxidation method using a hypochlorite. However, an amount of carboxyl groups in the polycarboxylic acid obtained by the method disclosed does not exceed two on average per monosaccharide unit, excluding a special example. As the special example wherein the content of carboxyl groups exceeds 2 per monosaccharide unit, Example 78 discloses oxidation of a previously producing a monocarboxylated corn starch and Examples 79 and 80 disclose the example using sodium arginate as the polysaccharide. However, in these Examples, there is no description of the molecular weight of the resulting polycarboxylic acid and, therefore, these Examples do not suggest a polycarboxylic acid having a structure wherein both content of carboxyl groups and molecular weight are clearly defined. In the production method described in these Examples, a large amount of acetic acid is used when the formed dialdehyde derivative is oxidized with sodium hypochlorite to form a dicarboxylic acid. However, it is well known that, under these acidic conditions, polysaccharides are hydrolyzed and the molecular weight is drastically lowered. Besides, this method has a problem that the production process becomes complicated because the monocarboxylated starch is at once produced and further oxidized. On the other hand, when arginic acid is used as a raw material, the method is uneconomical.

JP-A-60-226502 discloses a method of oxidizing polysaccharides using a hypochlorite as an oxidizing agent under controlled reaction conditions to obtain a polycarboxylic acid. The polycarboxylic acid obtained by this method has sufficiently high molecular weight, but the content of the carboxyl unit is 81% at most and the content of carboxyl groups is less than 2 on average per monosaccharide unit. Therefore, it is not a polycarboxylic acid having a structure which simultaneously satisfies the requirements for content of carboxyl groups and the molecular weight.

JP-A-62-247837 discloses a method of oxidizing polysaccharides using a metal catalyst such as Pd in combination with an accelerator such as Bi to obtain a polycarboxylic acid. However, this method is characterized by oxidizing the reducing terminal end of polysacoharides and also the content of carboxyl groups does not exceed 2 on average per monosaccharide unit.

JP-A-4-175301 discloses a method of oxidizing polysaccharides in the presence of a hypobromite or a hypoiodite. This reference does not disclose data which suggest the structure of a polycarboxylic acid product. However, since there is a description "it is understood in this specification that the term "dicarboxy polysaccharides or polycarboxy saccharides" used herein mean polysaccharides wherein almost all of C2–C3 diol functional groups are respectively converted into two carboxyl groups by means of ring opening" in the specification, the amount of carboxyl groups contained in the polycarboxylic acid is considered to be 2 at most as an average value per monosaccharide unit.

JP-A-4-233901 discloses a method of oxidizing an enzyme hydrolysate of starch or dextrin with a hypochlorite or a periodate. In this reference, there is no description about the structure of the polycarboxylic acid obtained by the oxidation reaction, particularly content of carboxyl groups. Also, a clear measurement of the molecular weight is not disclosed. Even if the molecular weight is calculated based on the distribution of a glucoside unit disclosed in Example 5, assuming that a decrease in molecular weight does not arise at the time of the subsequent oxidation reaction and that three carboxyl groups are introduced per unit after the maximum reaction, a weight-average molecular weight is 915 at most. When using, as a raw material, starch or dextrin from which a higher molecular weight material may be obtained, as shown in Comparative Example 1, a Ca ion sequestration capacity of the resulting polycarboxylic acid is still low, e.g. 200 and 225, which shows that the content of carboxyl groups in the oxidation reaction product is low.

JP-A-08-500626 discloses a method of oxidizing potato starch suspended in carbon tetrachloride with dinitrogen tetraoxide, followed by oxidation with oxygen. The carboxyl group content of the polycarboxylic acid obtained by this method is very low, e.g. about 1 in average number of carboxyl groups per glucose unit.

As described above, a polycarboxylic acid obtained by oxidizing polysaccharides containing an anhydrous glucose as a constituent unit, or a salt thereof wherein the content of carboxyl groups exceeds 2 per anhydrous glucose unit and the weight-average molecular weight is not less than 2000 are not known.

DISCLOSURE OF THE INVENTION

The object of the present invention of the present invention is to provide a method of producing a polycarboxylic acid or a salt thereof having a high carboxylic group content and a high molecular weight from polysaccharides containing an anhydrous glucose as a constituent unit, and a polycarboxylic acid or a salt hereof obtained by the method.

That is, according to the present invention, there is provided a polycarboxylic acid or a salt thereof, derived from polysaccharides containing an anhydrous glucose as a constituent unit, characterized in that the amount of an alkali required to perform neutralization titration of the free acid form of the polycarboxylic acid is not less than 435 mg in terms of sodium hydroxide per 1 g of said polycarboxylic acid and the weight-average molecular weight of said polycarboxylic acid is not less than 2000.

According to the present invention, there is also provided a method for producing a polycarboxylic acid or a salt thereof, wherein the amount of an alkali required to perform neutralization titration of the free acid form of the polycarboxylic acid is not less than 435 mg in terms of sodium hydroxide per 1 g of the polycarboxylic acid and the weight average molecular weight of said polycarboxylic acid is not less than 2000, characterized in that a polysaccharide containing an anhydrous glucose as a constituent unit is oxidized in the presence of a transition metal catalyst using an oxidizing agent.

Since the structure of the polycarboxylic acid of the present invention is complicated, it is difficult to show a clear structural formula. The polycarboxylic acid obtained by using starch as a raw material is represented by following general formula (I) and, based on the amount of sodium hydroxide required for neutralization titration, it can be said to be a polycarboxylic acid having at least 2.1 carboxyl groups on average per anhydrous glucose unit.

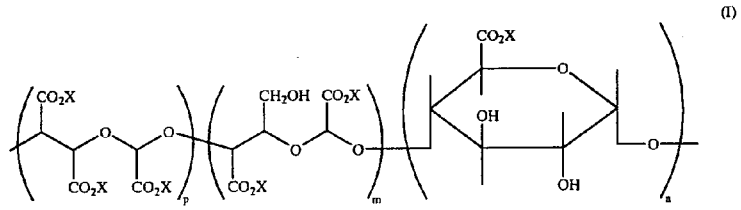

wherein X is H or a salt-forming cation and $(3p+2m+n)/(p+m+n)$ is from 2.1 to 3.0.

The reason is as follows. That is, in the case of a polycarboxylic acid having two carboxylic groups per anhydrous glucose, wherein a C2–C3 bond of an anhydrous glucose is formed by oxidation ring opening (i.e. dicarboxyl polysaccharide of the above structural formula wherein P is 0 and n is 0), the amount of sodium hydroxide required for neutralization titration is 417 mg at most per 1 g of the free acid form polycarboxylic acid.

The salt form of the polycarboxylic acid of the present invention includes salts of alkaline metals such as Na, K, Li, etc. and salts of amines such as ammonia, alkylamine, alkanolamine, etc. Among them, Na salt or K salt is preferable in view of ease of producing. A part of the carboxyl groups may be converted into a salt.

In the present invention, as the method of determining the content of carboxyl groups, a neutralization titration method can be used as described above. When the free acid form of the polycarboxylic acid must be obtained for the neutralization titration, the salt form is treated with a cation exchange resin as described hereinafter. The method of determining the molecular weight is carried out using the GPC method using a standard polyacrylic acid as described hereinafter.

The polysaccharides used for obtaining the polycarboxylic acid of the present invention or salt thereof may be any polysaccharides containing an anhydrous glucose as a constituent unit, and are not specifically limited. Examples thereof include starch, dextrin, cellulose or a hydrolysate thereof, or amylose or amylopectin obtained by fractionating starch. These polysaccharides are used in combination. Also, origin of these polysaccharides is not specifically limited. In case of starch, for example, corn starch, wheat starch, rice starch, tapioca starch, etc. may be used. In case of cellulose, for example, cellulose obtained from conifer tree, broad leaf tree, cotton, etc. may be used. Among these polysaccharides, starch or cellulose is preferably used in view of the availability or economics. Particularly preferred is starch.

The polycarboxylic acid of the present invention or salt thereof is obtained by oxidizing polysaccharides containing an anhydrous glucose using a combination of a specific catalyst and a specific oxidizing agent. That is, the polycarboxylic acid or salt thereof can be produced by adding an oxidizing agent while maintaining the pH of the solution within a fixed range.

Examples of the transition metal catalyst used in the present invention are Ru, Os, Rh, Ir, Pt, Pd, etc., preferably ruthenium catalyst or osmium catalyst. These transition metal catalysts may be used in the form of salts such as chloride, sulfide, oxide, etc. or used as they are or on carriers such as carbon, alumina, etc. The amount of these metal catalysts used is from 0.05 to 10 molar %, preferably from 0.1 to 7 molar %, more preferably from 0.5 to 5 molar %, per anhydrous glucose unit of polysaccharides.

Examples of the oxidizing agent used in the present invention include hypohalite (e.g. Na salt, K salt, Ca salt, Mg salt, etc.), bleaching powder, perhalite, persulfate, peracetate and the like. Preferably, bleaching powder or hypohalite is used and use of hypohalite is particularly preferable. The amount of these oxidizing agents used varies depending on the content of carboxyl groups in the polycarboxylic acid to be finally obtained, but is normally from 3 to 12 mol, preferably from 4 to 9 mol, per mol of anhydrous glucose unit of the polysaccharides. The reaction is performed by adding these oxidizing agents into a dispersion of polysaccharides and a transition metal catalyst in water. The method of adding the oxidizing agent is not specifically limited, but the oxidizing agent is normally added continuously or in several portions. The reaction time is not specifically limited, but is normally from 2 to 24 hours, preferably from 3 to 18 hours. The reaction temperature is not specifically limited, but is normally from 5 to 50° C., preferably from 10 to 40° C.

The pH of the solution during the reaction is maintained within the range from 6 to 13, preferably from 7 to 12. Adjustment of the pH can be performed by using hydroxides of alkaline metals, such as sodium hydroxide, potassium hydroxide, lithium hydroxide, etc.; or amines such as ammonia, alkylamine, alkanolamine, etc. Preferably, sodium hydroxide or potassium hydroxide is used.

Under the above reaction conditions, cleavage of a glucoside bond of a backbone chain of polysaccharides does not easily occur, and the hydroxyl group of the polysaccharides is oxidized with good efficiency. Therefore, it is possible to obtain a desired polycarboxylic acid wherein the amount of sodium hydroxide required to perform neutralization titration of the acid form of the polycarboxylic acid is not less than 435 mg per 1 g of the polycarboxylic acid and the weight-average molecular weight is not less than 2000, or a salt thereof. The upper limit of the molecular weight of the polycarboxylic acid is about 50000 in weight-average molecular weight. This polycarboxylic acid or salt thereof is suitably used as a builder for detergent or a scum inhibitor because the chelation of a polyvalent cation such as Ca, Mg, etc. is high as a result of high molecular weight and high content of carboxyl groups.

In the polycarboxylic acid produced by the oxidation of polysaccharides of the present invention, the amount of neutralization titration using sodium hydroxide (NaOH) and molecular weight vary depending on the type of polysaccharides used, the type of oxidizing agent, the type of catalyst and reaction conditions. In the present invention, the amount of neutralization titration is not less than 435 mg/g, particularly from 486 to 582 mg/g, and the molecular weigh is not less than 2000, preferably from 2,500 to 15,000, in weight-average molecular weight. In the present invention, it is particularly preferable that the polycarboxylic acid is produced by oxidizing starch, as the raw polysaccharide, with a hypochlorite or a bleaching powder in the presence of a ruthenium catalyst.

In the present invention, the oxidation reaction product obtained by the above oxidation reaction is preferably treated with a reducing agent. Color tone of the oxidation reaction product can be improved by this treatment using the reducing agent. The oxidation reaction product shows a black or brown color and is inferior in color tone, but the color tone can be improved to a better color tone (e.g. blue color, yellow color, etc.) by subjecting to a reducing agent treatment.

The reducing agent may be any one whose redox potential is lower than that of the oxidizing agent used, and preferred examples thereof include sulfite (e.g. sodium salt, potassium salt, ammonium salt, etc.), dithionite (e.g. sodium salt, potassium salt, ammonium salt, etc.) and hydrogen peroxide. The amount of the reducing agent used varies depending on the amount of the oxidizing agent remaining in the reaction system after the completion of the oxidation reaction, but is generally from 0.3 to 10 mol, preferably from 0.5 to 5 mol, per mol of the residual oxidizing agent.

Next, the method for the measurement of the neutralization titration amount (hereinafter sometimes referred to as "carboxyl group content A") and molecular weight of the polycarboxylic acid will be described.

Measurement of Carboxyl Group Content A

After precisely weighing about 0.2 g (absolute dry weight) of an acid form polycarboxylic acid, the acid form polycarboxylic acid is charged into a conical beaker having a volume of 200 ml and about 50 ml of deionized water is added to dissolve the acid form polycarboxylic acid. Using phenolphthalein as an indicator and a 1/10 N standard sodium hydroxide solution, titration of the resulting solution is performed and a carboxyl group content A is indicated as the amount (mg) of sodium hydroxide required to neutralize 1 g of the acid form polycarboxylic acid.

When it is apparent that a part or all of the polycarboxylic acid whose carboxyl group content A is to be measured is in the form of a salt, the polycarboxylic acid is first converted into the free polycarboxylic acid by the following method. That is, it is converted into the acid form polycarboxylic acid by preparing an aqueous solution (about 1% by weight) of the polycarboxylic acid, passing the aqueous solution through a column packed with a cation exchange resin (DOWEX 50W-X8), followed by cation exchange. The cation exchange resin is used in an amount of 10 ml per 1 g of an aqueous solution (1% by weight) of the polycarboxylate. The free polycarboxylic acid can be obtained in the form of a powder by freeze-drying the eluent or drying it under reduced pressure (40° C. or less).

Measurement of Molecular Weight by Means of GPC

About 5 mg of the same polycarboxylic acid powder as that used in the neutralization titration is dissolved in 5 ml of a phosphate buffer solution (pH 7, concentration: 0.1 mol/liter) containing NaCl having a concentration of 0.3 mol/liter and the molecular weight is determined by means of GPC under the following conditions as the weight-average molecular weight.

Column used: manufactured by Toso Co., Ltd., G-4000PW+G-2500PW

Eluent: phosphate buffer (concentration: 0.1 mol/liter) containing NaCl having a concentration of 0.3 mol/liter, pH7

Eluation rate: 0.5 ml/min.

Column temperature: 40° C.

Amount of sample to be charged: 200 µl

Calibration curve: standard Na polyacrylate manufactured by Polyscience Co. (weight-average molecular weight: 2100, 5000, 20000, 35000 and 165300) was used.

EXAMPLES

The following Examples will further illustrate the present invention in detail. In the following, percentages are by weight unless otherwise stated.

Example 1

In a separable flask (volume: 500 ml) equipped with a stirrer, a dropping funnel for oxidizing agent, a dropping inlet for aqueous sodium hydroxide solution, a pH electrode and a thermometer, 10 g (absolute dry weight) of corn starch, 100 g of deionized water and 0.49 g (3% by mol per anhydrous glucose unit of starch) of $RuCl_3nH_2O$ (Ru content: 38% by weight) were charged after weighing. The mixture was cooled with a water bath at 20° C. and, at the time when the inner temperature reached about 20° C., 230 g (6 mol per mol of an anhydrous glucose unit) of an aqueous solution (12% by weight) of Na hypochlorite was added over 3 hours. During the addition, an aqueous 2 N sodium hydroxide solution was added using a pH-stat to control the pH in the system to 9.

After the completion of the addition of Na hypochlorite, stirring was continued for an additional two hours and the reaction mixed solution was slowly poured into about 1 liter of ethanol to precipitate the reaction product. The resulting precipitate was dissolved in 150 ml of deionized water, purified by subjecting to diffusion dialysis using deionized water for 5 days and then freeze-dried to obtain 7.5 g of a powder of Na polycarboxylate.

With respect to the resulting Na polycarboxylate, the carboxyl group content A obtained by the above method was 521 mg and the weight-average molecular weight was 5800.

The Ca ion sequestration capacity (CEC) determined by the following method was 410 mg/g.

Measurement of Ca Ion Sequestration Capacity (CEC)

A Ca solution having a concentration of 100 ppm in terms of $CaCO_3$ was prepared by diluting a standard $CaCl_2$ solution having a concentration of 0.1 mol/liter (manufactured by Orion Research Co.). On the other hand, the polycarboxylic acid to be tested was dissolved in deionized water to prepare an aqueous solution wherein the concentration of Na polycarboxylate was precisely 1by weight, which was taken as a test solution.

After weighing 100 ml of the Ca solution, 2 ml of a KCl solution having a concentration of 4 mol/liter was added and the pH of the solution was adjusted to 10 by using 1/10 N NaOH. An initial concentration of the Ca ion was measured with stirring this aqueous solution using a Ca ion electrode. After 2 ml of the test solution was precisely added and the pH was adjusted again to 10, the Ca ion concentration was measured by using a Ca ion electrode. The amount obtained by subtracting the Ca ion concentration after the addition of the test solution from the initial concentration of the Ca ion was taken as the amount of Ca ion chelated. The amount of the Ca ion chelated by 1 g of Na polycarboxylate was taken as an amount (mg) of $CaCO_3$.

Example 2

In the same separable flask (volume: 500 ml) as that used in Example 1, 10 g (absolute dry weight) of corn starch, 50 g of deionized water and 0.16 g (1% by mol per anhydrous glucose unit of starch) of $RuCl_3 \cdot nH_2O$ (Ru content: 38% by weight) were charged after weighing. The mixture was cooled with a water bath at 20° C. and, at the time when the inner temperature reached about 20° C., 192 g (5 mol per mol of an anhydrous glucose unit) of an aqueous Na hypochlorite solution (12by weight) was added over 5 hours During the addition, an aqueous 2 N sodium hydroxide solution was added using a pH-stat to control the pH in the system to 10.

After the completion of the addition of Na hypochlorite, stirring was continued for an additional two hours and then 7.8 g of Na polycarboxylate was obtained in the same manner as that described in Example 1.

The carboxyl group content A in the resulting Na polycarboxylate was 489 mg, the weight-average molecular weight was 8100, and CEC was 402 mg/g.

Comparative Example 1

3g of Na polycarboxylate obtained in Example 2 was dissolved in 50 g of deionized water and, after the pH was adjusted to 3.0 by using 1 N hydrochloric acid, the solution was hydrolyzed with heating in a hot water bath at 80° C. while stirring using a magnetic stirrer for 2 hours. After cooling to room temperature, the pH was adjusted to 10 by using 1 N NaOH and the resultant solution was poured into 500 ml of ethanol. The resulting precipitate was dissolved in 30 ml of deionized water, subjected to diffusion dialysis using deionized water for 5 days and then freeze-dried to obtain 1.1 g of hydrolyzed Na polycarboxylate.

The carboxyl group content A in this hydrolyzed Na polycarboxylate was 486 mg, but the weight-average molecular weight was reduced to 1200 and CEC was also reduced to 280 mg/g.

Example 3

In the same manner as in Example 1 except for using 0.47 g (3% by mol per an anhydrous glucose unit of starch) of osmium tetraoxide in place of $RuCl_3 \cdot nH_2O$ (Ru content: 38% by weight), 6.8 g of Na polycarboxylate was obtained. The carboxyl group content A of the resulting Na polycarboxylate was 458 mg and the weight-average molecular weight was 4200. CEC was 340 mg/g.

Example 4

In the same manner as in Example 1, except for using 10 g a cellulose powder (reagent) in place of corn starch, 8.2 g of Na polycarboxylate was obtained. The carboxyl group content A of the resulting Na polycarboxylate was 440 mg and the weight-average molecular weight was 6200. CEC was 365 mg/g.

Examples 5 to 9

In the same manner as described in Example 1, except for varying the reaction conditions such as, type of polysaccharides, type of catalyst, amount of Na hypochlorite (NaClO) and pH during the reaction, Na polycarboxylate was obtained.

The Ru content of a carbon-carrying Ru shown in Table 1 is 5% by weight, and each of the amount of the catalyst and amount of NaClO used is an amount per anhydrous glucose unit of polysaccharides.

TABLE 1

| Item | Example 5 | Example 6 | Example 7 | Example 8 | Example 9 |
|---|---|---|---|---|---|
| Reaction conditions | | | | | |
| Kind of polysaccharides | Corn starch | Wheat starch | Amylopectin | Corn starch | Corn starch |
| Kind of catalyst | $RuCl_3$ | $RuCl_3$ | Carbon-carrying Ru | $RuCl_3$ | $RuO_2$ |
| Catalyst amount (% by mol) | 5 | 7 | 1 | 0.5 | 0.5 |
| NaClO (mol) | 6 | 9 | 6 | 5 | 5 |
| pH | 11 | 10 | 8 | 7 | 9 |
| Temperature (° C.) | 20 | 20 | 20 | 30 | 20 |
| Yield (g) | 7.8 | 7.4 | 8.3 | 8.1 | 7.9 |
| Property | | | | | |
| Carboxyl group content A (mg) | 551 | 558 | 514 | 488 | 451 |
| Weight-average molecular weight | 4300 | 2800 | 6200 | 3800 | 12500 |
| Performance | | | | | |
| CEC (mgCaCO₃/g) | 425 | 408 | 412 | 397 | 389 |

Example 10

In the same separable flask (volume: 500 ml) as that used in Example 1, 10 g (absolute dry weight) of corn starch and 90 g of deionized water were charged. Thereafter, the separable flask was put in a constant temperature bath at 20° C. and corn starch was dispersed by stirring. Then, 0.49 g (3% by mol per an anhydrous glucose unit of starch) of $RuCl_3 \cdot nH_2O$ (Ru content: 38% by weight) was added, followed by stirring. At the time when the inner temperature reached about 20° C., 213 g (6 mol per mol of an anhydrous glucose unit) of an aqueous Na hypochlorite solution (13% by weight) was added dropwise for 6 hours, continuously. During the dropwise addition, an aqueous 2 N sodium hydroxide solution was added dropwise using a pH-stat to control the pH in the system to 8.

After the completion of the dropwise addition of the aqueous sodium hypochlorite solution, the concentration of the residual sodium hypochlorite was measured. As a result, it was found to be 1% by weight. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 7.2 g of a powder of sodium polycarboxylate.

The carboxyl group content A of the resulting sodium polycarboxylate was 500 mg and the weight-average molecular weight was 4000. The color was pale blue.

In the same manner as that described in the above test, except for using no sodium sulfite, 7.5 g of a powder of sodium polycarboxylate was obtained. The carboxyl group content A of the product obtained by the above method was 500 mg and the weight-average molecular weight was 4000. The color of the powder was black.

Example 11

The same procedure as that described in Example 10 was repeated, except that the amount of sodium sulfite was changed. The results are shown in Table 2.

TABLE 2

| Sodium sulfite (mol per mol of oxidizing agent) | 0.5 | 2 | 5 |
|---|---|---|---|
| Carboxyl group content A (mg) | 500 | 500 | 500 |
| Weight-average molecular weight | 4000 | 4000 | 4000 |
| Color tone of powder | Bluish green | Nearly colorless | Nearly colorless |

Example 12

In the same manner as described in Example 10, except for changing the amount of RuCl$_3$.nH$_2$O (Ru content: 38% by weight) to 0.05 g (0.3% by mol per anhydrous glucose unit of starch), the reaction was performed.

After the completion of the dropwise addition of the aqueous sodium hypochlorite solution, the concentration of the residual sodium hypochlorite was 1.3%. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 5.2 g of a powder of sodium polycarboxylate.

The carboxyl group content A of the resulting sodium polycarboxylate was 450 mg and the weight-average molecular weight was 2500. The color was pale yellow.

Example 13

In the same manner as described in Example 10, except for changing the amount of RuCl$_3$.nH$_2$O (Ru content: 38% by weight) to 1.6 g (10% by mol per anhydrous glucose unit of starch), the reaction was performed.

After the completion of the dropwise addition of the aqueous sodium hypochlorite solution, the concentration of the residual sodium hypochlorite was 1.2%. Then, sodium sulfite was added in a two-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the resulting precipitate was purified by using an ultrafiltration device and then freeze-dried to obtain 5.2 g of a powder of sodium polycarboxylate.

The carboxyl group content A of the resulting sodium polycarboxylate was 520 mg and the weight-average molecular weight was 4000. The color was pale blue.

Example 14

In the same separable flask (volume: 500 ml) as that used in Example 1, 10 g (absolute dry weight) of corn starch and 90 g of deionized water were charged. Thereafter, the separable flask was put in a constant temperature bath at 20° C. and corn starch was dispersed by stirring. Then, 0.16 g (1% by mol per an anhydrous glucose unit of starch) of RuCl$_3$.nH$_2$O (Ru content: 38% by weight) was added, followed by stirring. At the time when the inner temperature reached about 20° C., 213 g (6 mol per mol of an anhydrous glucose unit) of an aqueous Na hypochlorite solution (13% by weight) was added dropwise for 3 hours, continuously. During the dropwise addition, an aqueous 2 N sodium hydroxide solution was added dropwise using a pH-stat to control the pH in the system to 10.

After the completion of the dropwise addition of the aqueous is sodium hypochlorite solution, the concentration of the residual sodium hypochlorite was measured. As a result, it was found to be 0.5% by weight. Then, a reducing agent shown in Table 3 was added in a five-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain a powder of sodium polycarboxylate. The results are shown in Table 3.

TABLE 3

| Reducing agent | Sodium sulfite | Na dithionite (Hydrosulfite) |
|---|---|---|
| Carboxyl group content A (mg) | 460 | 460 |
| Weight-average molecular weight | 3000 | 3000 |
| Color tone of powder | Pale blue | Pale yellow |

Example 15

In the same manner as in Example 10, except for changing the reaction conditions as shown in Table 4, the reaction was performed. After the completion of the dropwise addition of an aqueous sodium hypochlorite solution, the amount of the residual sodium hypochlorite was measured and then sodium sulfite was added in an amount of 2 mol per mol of the residual sodium hypochlorite. The results are shown in Table 4.

TABLE 4

| Test No. | 1 | 2 | 3 | 4 | 5 | 6 | 7 | 8 |
|---|---|---|---|---|---|---|---|---|
| Kind of polysaccharides | Corn starch | Tapioca starch | Potato starch | Wheat starch | Soluble starch | Amylopectin | Cellulose powder | Corn starch |
| Kind of catalyst | $RuCl_3$ | $RuCl_3$ | $RuCl_3$ | $RuCl_3$ | $RuCl_3$ | Carbon-carrying Ru | $RuCl_3$ | None |
| Catalyst amount (% by mol)* | 3 | 3 | 5 | 1 | 3 | 0.5 | 3 | 0 |
| Sodium hypochlorite amount (mol)** | 3 | 6 | 6 | 12 | 5 | 6 | 6 | 6 |
| Time of sodium hypochlorite to be added (hour) | 3 | 6 | 18 | 6 | 5 | 1.5 | 3 | 3 |
| Reaction temperature (° C.) | 20 | 20 | 20 | 40 | 5 | 20 | 20 | 20 |
| Reaction pH | 9 | 12 | 6 | 9 | 8 | 8 | 10 | 9 |
| Carboxyl group content A (mg) | 513 | 517 | 537 | 517 | 501 | 450 | 460 | 312 |
| Weight-average molecular weight | 3300 | 4200 | 6600 | 2700 | 3500 | 3600 | 5500 | 5000 |
| Color tone of powder | Pale blue | Pale blue | Pale yellow | Pale blue | Pale blue | Pale yellow | Pale blue | Colorless |

*per anhydrous glucose unit
**per mol of anhydrous glucose unit

Example 16

In the same manner as in Example 10, except for using 0.47 g (3% by mol per an anhydrous glucose unit of starch) of osmium tetraoxide in place of $RuCl_3 \cdot nH_2O$, 6 g of sodium polycarboxylate was obtained. The carboxyl group content A of the resulting sodium polycarboxylate was 450 mg. The weight-average molecular weight was 3800 and the color of the powder was pale yellow.

According to the present invention, there can be obtained a polycarboxylic acid having high carboxyl group content and high molecular weight, or a salt thereof, in good yield.

The polycarboxylic acid of the present invention or salt thereof can be used as a dispersant, a chelating agent or a flocculant. Since the carboxyl group content is high and the chelation capacity for polyhydric cations such as Ca, Mg, etc. is large, the polycarboxylic acid or salt thereof is particularly suitable as a builder for detergent or a scum inhibitor.

What is claimed is:

1. A method for producing a polycarboxylic acid or a salt thereof, wherein the polycarboxylic acid contains, in its acid form, carboxylic acid groups in a number requiring an amount of alkali for neutralization of its acid form not less than 435 mg in terms of sodium hydroxide per 1 g of the polycarboxylic acid and the weight-average molecular weight of said polycarboxylic acid is not less than 2000, comprising oxidizing a polysaccharide containing anhydrous glucose as a constituent unit in the presence of a transition metal catalyst, using an oxidizing agent selected from the group consisting of hypohalites, bleaching powder, perhalites, persulfates and peracetates, said transition metal catalyst containing at least one member selected from the group consisting of Ru, Os, Tr, Pt, Pd and oxides and salts thereof.

2. A method according to claim 1 wherein said transition metal catalyst contains at least one member selected from the group consisting of Ru and Os and oxides and salts thereof.

* * * * *

UNITED STATES PATENT AND TRADEMARK OFFICE
CERTIFICATE OF CORRECTION

PATENT NO. : 6,008,345
DATED : December 28, 1999
INVENTOR(S) : Yukihiro Dannoue et al.

It is certified that error appears in the above-identified patent and that said Letters Patent is hereby corrected as shown below:

Delete title page and substitute new title page as shown on attached page.

Delete the specification and claims in columns 1-14, and substitute the new specification and claims in columns 1-12, as shown on the attached pages.

Signed and Sealed this

Twenty-third Day of May, 2006

JON W. DUDAS
*Director of the United States Patent and Trademark Office*

United States Patent [19]
Dannoue et al.

[11] Patent Number: 6,008,345
[45] Date of Patent: Dec. 28, 1999

[54] PROCESS FOR MAKING POLYCARBOXYLIC ACID DERIVED FROM POLYSACCHARIDE COMPOSED OF ANHYDROUS GLUCOSE UNITS AND SALTS THEREOF

[75] Inventors: Yukihiro Dannoue; Kiyoshi Morohara; Kiyoshi Nakayama, all of Tokyo, Japan

[73] Assignee: Lion Corporation, Japan

[21] Appl. No.: 08/981,304

[22] PCT Filed: Jun. 28, 1996

[86] PCT No.: PCT/JP96/01809

§ 371 Date: Dec. 16, 1997

§ 102(e) Date: Dec. 16, 1997

[87] PCT Pub. No.: WO97/02293

PCT Pub. Date: Jan. 23, 1997

[30] Foreign Application Priority Data

Jun. 30, 1995 [JP] Japan ............................. 7-188612

[51] Int. Cl.$^6$ ............................................. C07H 1/00
[52] U.S. Cl. ...................... 536/124; 536/105; 536/110; 536/119; 536/128
[58] Field of Search ............................. 536/124, 128, 536/119, 110, 105

[56] References Cited

U.S. PATENT DOCUMENTS

| | | |
|---|---|---|
| 3,873,614 | 3/1975 | Lamberti et al. ..................... 536/124 |
| 4,056,400 | 11/1977 | Diamantoglou et al. ............. 106/162 |
| 4,985,553 | 1/1991 | Fuertes et al. ........................ 536/124 |
| 5,326,864 | 7/1994 | Besemer et al. ..................... 536/123.1 |
| 5,417,755 | 5/1995 | Suc et al. ............................. 106/210 |

FOREIGN PATENT DOCUMENTS

| | | |
|---|---|---|
| 0427349 | 5/1991 | European Pat. Off. . |
| 0472042 | 2/1992 | European Pat. Off. . |
| 60-226502 | 4/1984 | Japan . |
| 62-247837 | 1/1987 | Japan . |
| 9405762 | 3/1994 | WIPO . |
| 9601809 | 8/1996 | WIPO . |
| 9702293 | 1/1997 | WIPO . |

*Primary Examiner*—L. Eric Crane
*Attoney, Agent, or Firm*—Lorusso & Loud

[57] ABSTRACT

There is described a polycarboxylic acid or a salt thereof obtained by oxidation of a polysaccharide containing an anhydrous glucose as a constituent unit, wherein the carboxyl group content thereof is high and the weight average molecular weight thereof is not less than 2000. This polycarboxylic acid is suitable for use as a builder for detergent because the amount of an alkali required to perform neutralization titration of the polycarboxylic acid is not less than 435 mg in terms of sodium hydroxide and because the chelate force thereof to a polyvalent cation is high.

The polycarboxylic acid is produced by oxidizing a polysaccharide with an oxidizing agent in the presence of a transition metal catalyst.

2 Claims, No Drawings

PROCESS FOR MAKING POLYCARBOXYLIC ACID DERIVED FROM POLYSACCHARIDE COMPOSED OF ANHYDROUS GLUCOSE UNITS AND SALTS THEREOF

This application is a 371 of PCT/JP96/01809, filed Jun. 28, 1996, now abandoned.

TECHNICAL FIELD

The present invention relates to a polycarboxylic acid or a salt thereof produced by oxidation of a polysaccharide containing an anhydrous glucose as a constituent unit and to a method of producing same.

BACKGROUND ART

Polycarboxylic acids such as polyacrylic acid, copolymer of acrylic acid and maleic acid, etc. are used as a dispersant, a chelating agent or a flocculant. It is generally known that, when these polycarboxylic acids are used as the chelating agent, the effect is influenced by the content of carboxyl groups and molecular weight and, furthermore, the larger the content of carboxyl groups and molecular weight, the better the effect to be exerted. When a chelating capacity of these polycarboxylic acids is measured by the method shown in the Examples described hereinafter, the polyacrylic acid exhibits a Ca ion sequestration capacity of about 300 mg/g. The copolymer of acrylic acid and maleic acid exhibits a Ca ion sequestration capacity of about 370 mg/g.

However, it is also well known that it is very hard to perform biodegradation of the polycarboxylic acid obtained by polymerizing a monomer having a vinyl group, such as polyacrylic acid, copolymer of acrylic acid and maleic acid, etc., using microorganisms. Therefore, for the purpose of obtaining a chelating agent which is useful as a builder for detergent, an attempt has been made to oxidize polysaccharides, natural polymers, to obtain a polycarboxylic acid whose biodegradation is expected, or a salt thereof.

JP-B-49-1281 discloses that a polycarboxylic acid is obtained from various polysaccharides by a two-stage oxidation method using periodic acid and chlorite or a single-stage oxidation method using a hypochlorite. However, an amount of carboxyl groups in the polycarboxylic acid obtained by the method does not exceed two on average per monosaccharide unit, excluding a special example. As the special example wherein the content of carboxyl groups exceeds 2 per monosaccharide unit, Example 78 discloses oxidation of a previously producing a monocarboxylated corn starch and Examples 79 and 80 disclose the example using sodium arginate as the polysaccharide. However, in these Examples, there is no description of the molecular weight of the resulting polycarboxylic acid and, therefore, these Examples do not suggest a polycarboxylic acid having a structure wherein both content of carboxyl groups and molecular weight are clearly defined. In the production method described in these Examples, a large amount of acetic acid is used when the formed dialdehyde derivative is oxidized with sodium hypochlorite to form a dicarboxylic acid. However, it is well known that, under these acidic conditions, polysaccharides are hydrolyzed and the molecular weight is drastically lowered. Besides, this method has a problem that the production process becomes complicated because the monocarboxylated starch is at once produced and further oxidized. On the other hand, when arginic acid is used as a raw material, the method is uneconomical.

JP-A-60-226502 discloses a method of oxidizing polysaccharides using a hypochlorite as an oxidizing agent under controlled reaction conditions to obtain a polycarboxylic acid. The polycarboxylic acid obtained by this method has sufficiently high molecular weight, but the content of the carboxyl unit is 81% at most and the content of carboxyl groups is less than 2 on average per monosaccharide unit. Therefore, it is not a polycarboxylic acid having a structure which simultaneously satisfies the requirements for content of carboxyl groups and the molecular weight.

JP-A-62-247837 discloses a method of oxidizing polysaccharides using a metal catalyst such as Pd in combination with an accelerator such as Bi to obtain a polycarboxylic acid. However, this method is characterized by oxidizing the reducing terminal end of polysacoharides and also the content of carboxyl groups does not exceed 2 on average per monosaccharide unit.

JP-A-4-175301 discloses a method of oxidizing polysaccharides in the presence of a hypobromite or a hypoiodite. This reference does not disclose data which suggest the structure of a polycarboxylic acid product. However, since there is a description "it is understood in this specification that the term "dicarboxy polysaccharides or polycarboxy saccharides" used herein mean polysaccharides wherein almost all of C2–C3 diol functional groups are respectively converted into two carboxyl groups by means of ring opening" in the specification, the amount of carboxyl groups contained in the polycarboxylic acid is considered to be 2 at most as an average value per monosaccharide unit.

JP-A-4-233901 discloses a method of oxidizing an enzyme hydrolysate of starch or dextrin with a hypochlorite or a periodate. In this reference, there is no description about the structure of the polycarboxylic acid obtained by the oxidation reaction, particularly content of carboxyl groups. Also, a clear measurement of the molecular weight is not disclosed. Even if the molecular weight is calculated based on the distribution of a glucoside unit disclosed in Example 5, assuming that a decrease in molecular weight does not arise at the time of the subsequent oxidation reaction and that three carboxyl groups are introduced per unit after the maximum reaction, a weight-average molecular weight is 915 at most. When using, as a raw material, starch or, dextrin from which a higher molecular weight material may be obtained, as shown in Comparative Example 1, a Ca ion sequestration capacity of the resulting polycarboxylic acid is still low, e.g. 200 and 225, which shows that the content of carboxyl groups in the oxidation reaction product is low.

JP-A-08-500626 discloses a method of oxidizing potato starch suspended in carbon tetrachloride with dinitrogen tetraoxide, followed by oxidation with oxygen. The carboxyl group content of the polycarboxylic acid obtained by this method is very low, e.g. about 1 in average number of carboxyl groups per glucose unit.

As described above, a polycarboxylic acid obtained by oxidizing polysaccharides containing an anhydrous glucose as a constituent unit, or a salt thereof wherein the content of carboxyl groups exceeds 2 per anhydrous glucose unit and the weight-average molecular weight is not less than 2000 are not known.

DISCLOSURE OF THE INVENTION

The object of the present invention of the present invention is to provide a method of producing a polycarboxylic acid or a salt thereof having a high carboxylic group content and a high molecular weight from polysaccharides containing an anhydrous glucose as a constituent unit, and a polycarboxylic acid or a salt thereof obtained by the method.

That is, according to the present invention, there is provided a polycarboxylic acid or a salt thereof derived from polysaccharides containing an anhydrous glucose as a constituent unit, characterized in that the amount of an alkali required to perform neutralization titration of the free acid form of the polycarboxylic acid is not less than 435 mg in terms of sodium hydroxide per 1 g of said polycarboxylic acid and the weight-average molecular weight of said polycarboxylic acid is not less than 2000.

According to the present invention, there is also provided a method for producing a polycarboxylic acid or a salt thereof, wherein the amount of an alkali required to perform neutralization titration of the free acid form of the polycarboxylic acid is not less than 435 mg in terms of sodium hydroxide per 1 g of the polycarboxylic acid and the weight average molecular weight of said polycarboxylic acid is not less than 2000, characterized in that a polysaccharide containing an anhydrous glucose as a constituent unit is oxidized in the presence of a transition metal catalyst using an oxidizing agent.

Since the structure of the polycarboxylic acid of the present invention is complicated, it is difficult to show a clear structural formula. The polycarboxylic acid obtained by using starch as a raw material is represented by following general formula (I) and, based on the amount of sodium hydroxide required for neutralization titration, it can be said to be a polycarboxylic acid having at least 2.1 carboxyl groups on average per anhydrous glucose unit.

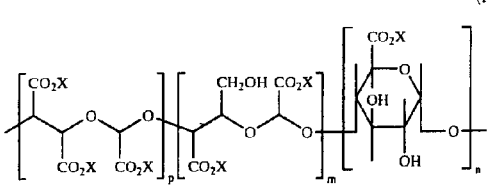

(I)

wherein X is H or a salt-forming cation and $(3p+2m+n)/(p+m+n)$ is from 2.1 to 3.0.

The reason is as follows. That is, in the case of a polycarboxylic acid having two carboxylic groups per anhydrous glucose, wherein a C2–C3 bond of an anhydrous glucose is formed by oxidation ring opening (i.e. dicarboxyl polysaccharide of the above structural formula wherein P is 0 and n is 0), the amount of sodium hydroxide required for neutralization titration is 417 mg at most per 1 g of the free acid form polycarboxylic acid.

The salt form of the polycarboxylic acid of the present invention includes salts of alkaline metals such as Na, K, Li, etc. and salts of amines such as ammonia, alkylamine, alkanolamine, etc. Among them, Na salt or K salt is preferable in view of ease of producing. A part of the carboxyl groups may be converted into a salt.

In the present invention, as the method of determining the content of carboxyl groups, a neutralization titration method can be used as described above. When the free acid form of the polycarboxylic acid must be obtained for the neutralization titration, the salt form is treated with a cation exchange resin as described hereinafter. The method of determining the molecular weight is carried out using the GFC method using a standard polyacrylic acid as described hereinafter.

The polysaccharides used for obtaining the polycarboxylic acid of the present invention or salt thereof may be any polysaccharides containing an anhydrous glucose as a constituent unit, and are not specifically limited. Examples thereof include starch, dextrin, cellulose or a hydrolysate thereof, or amylose or amylopectin obtained by fractionating starch. These polysaccharides are used in combination. Also, origin of these polysaccharides is not specifically limited. In case of starch, for example, corn starch, wheat starch, rice starch, tapioca starch, etc. may be used. In case of cellulose, for example, cellulose obtained from conifer tree, broad leaf tree, cotton, etc. may be used. Among these polysaccharides, starch or cellulose is preferably used in view of the availability or economics. Particularly preferred is starch.

The polycarboxylic acid of the present invention or salt thereof is obtained by oxidizing polysaccharides containing an anhydrous glucose using a combination of a specific catalyst and a specific oxidizing agent. That is, the polycarboxylic acid or salt thereof can be produced by adding an oxidizing agent while maintaining the pH of the solution within a fixed range.

Examples of the transition metal catalyst used in the present invention are Ru, Os, Rh, Ir, Pt, Pd, etc., preferably ruthenium catalyst or osmium catalyst. These transition metal catalysts may be used in the form of salts such as chloride, sulfide, oxide, etc. or used as they are or on carriers such as carbon, alumina, etc. The amount of these metal catalysts used is from 0.05 to 10 molar %, preferably from 0.1 to 7 molar %, more preferably from 0.5 to 5 molar %, per anhydrous glucose unit of polysaccharides.

Examples of the oxidizing agent used in the present invention include hypohalite (e.g. Na salt, K salt, Ca salt, Mg salt, etc.), bleaching powder, perhalite, persulfate, peracetate and the like. Preferably, bleaching powder or hypohalite is used and use of hypohalite is particularly preferable. The amount of these oxidizing agents used varies depending on the content of carboxyl groups in the polycarboxylic acid to be finally obtained, but is normally from 3 to 12 mol, preferably from 4 to 9 mol, per mol of anhydrous glucose unit of the polysaccharides. The reaction is performed by adding these oxidizing agents into a dispersion of polysaccharides and a transition metal catalyst in water. The method of adding the oxidizing agent is not specifically limited, but the oxidizing agent is normally added continuously or in several portions. The reaction time is not specifically limited, but is normally from 2 to 24 hours, preferably from 3 to 18 hours. The reaction temperature is not specifically limited, but is normally from 5 to 50° C., preferably from 10 to 40° C.

The pH of the solution during the reaction is maintained within the range from 6 to 13, preferably from 7 to 12. Adjustment of the pH can be performed by using hydroxides of alkaline metals, such as sodium hydroxide, potassium hydroxide, lithium hydroxide, etc.; or amines such as ammonia, alkylamine, alkanolamine, etc. Preferably, sodium hydroxide or potassium hydroxide is used.

Under the above reaction conditions, cleavage of a glucoside bond of a backbone chain of polysaccharides does not easily occur, and the hydroxyl group of the polysaccharides is oxidized with good efficiency. Therefore, it is possible to obtain a desired polycarboxylic acid wherein the amount of sodium hydroxide required to perform neutralization titration of the acid form of the polycarboxylic acid is not less than 435 mg per 1 g of the polycarboxylic acid and the weight-average molecular weight is not less than 2000, or a salt thereof. The upper limit of the molecular weight of the polycarboxylic acid is about 50000 in weight-average molecular weight. This polycarboxylic acid or salt thereof is suitably used as a builder for detergent or a scum inhibitor because the chelation of a polyvalent cation such as Ca, Mg, etc. is high as a result of high molecular weight and high content of carboxyl groups.

In the polycarboxylic acid produced by the oxidation of polysaccharides of the present invention, the amount of neutralization titration using sodium hydroxide (NaOH) and molecular weight vary depending on the type of polysaccharides used, the type of oxidizing agent, the type of catalyst and reaction conditions. In the present invention, the amount of neutralization titration is not less than 435 mg/g, particularly from 486 to 582 mg/g, and the molecular weight is not less than 2000, preferably from 2,500 to 15,000, in weight-average molecular weight. In the present invention, it is particularly preferable that the polycarboxylic acid is produced by oxidizing starch, as the raw polysaccharide, with a hypochlorite or a bleaching powder in the presence of a ruthenium catalyst.

In the present invention, the oxidation reaction product obtained by the above oxidation reaction is preferably treated with a reducing agent. Color tone of the oxidation reaction product can be improved by this treatment using the reducing agent. The oxidation reaction product shows a black or brown color and is inferior in color tone, but the color tone can be improved to a better color tone (e.g. blue color, yellow color, etc.) by subjecting to a reducing agent treatment.

The reducing agent may be any one whose redox potential is lower than that of the oxidizing agent used, and preferred examples thereof include sulfite (e.g. sodium salt, potassium salt, ammonium salt, etc.), dithionite (e.g. sodium salt, potassium salt, ammonium salt, etc.) and hydrogen peroxide. The amount of the reducing agent used varies depending on the amount of the oxidizing agent remaining in the reaction system after the completion of the oxidation reaction, but is generally from 0.3 to 10 mol, preferably from 0.5 to 5 mol, per mol of the residual oxidizing agent.

Next, the method for the measurement of the neutralization titration amount (hereinafter sometimes referred to as "carboxyl group content A") and molecular weight of the polycarboxylic acid will be described.

Measurement of Carboxyl Group Content A

After precisely weighing about 0.2 g (absolute dry weight) of an acid form polycarboxylic acid, the acid form polycarboxylic acid is charged into a conical beaker having a volume of 200 ml and about 50 ml of deionized water is added to dissolve the acid form polycarboxylic acid. Using phenolphthalein as an indicator and a $1/10$ N standard sodium hydroxide solution, titration of the resulting solution is performed and a carboxyl group content A is indicated as the amount (mg) of sodium hydroxide required to neutralize 1 g of the acid form polycarboxylic acid.

When it is apparent that a part or all of the polycarboxylic acid whose carboxyl group content A is to be measured is in the form of a salt, the polycarboxylic acid is first converted into the free polycarboxylic acid by the following method. That is, it is converted into the acid form polycarboxylic acid by preparing an aqueous solution (about 1% by weight) of the polycarboxylic acid, passing the aqueous solution through a column packed with a cation exchange resin (DOWEX 50W-X8), followed by cation exchange. The cation exchange resin is used in an amount of 10 ml per 1 g of an aqueous solution (1% by weight) of the polycarboxylate. The free polycarboxylic acid can be obtained in the form of a powder by freeze-drying the eluent or drying it under reduced pressure (40° C. or less).

Measurement of Molecular Weight by Means of GPC

About 5 mg of the same polycarboxylic acid powder as that used in the neutralization titration is dissolved in 5 ml of a phosphate buffer solution (pH 7, concentration: 0.1 mol/liter) containing NaCl having a concentration of 0.3 mol/liter and the molecular weight is determined by means of GPC under the following conditions as the weight-average molecular weight.

Column used: manufactured by Toso Co., Ltd., G-4000 PW+G-2500 PW

Eluent: phosphate buffer (concentration: 0.1 mol/liter) containing NaCl having a concentration of 0.3 mol/liter, pH 7

Eluation rate: 0.5 ml/min.

Column temperature: 40° C.

Amount of sample to be charged: 200 μl

Calibration curve: standard Na polyacrylate manufactured by Polyscience Co. (weight-average molecular weight: 2100, 5000, 20000, 35000 and 165300) was used.

EXAMPLES

The following Examples will further illustrate the present invention in detail. In the following, percentages are by weight unless otherwise stated.

Example 1

In a separable flask (volume: 500 ml) equipped with a stirrer, a dropping funnel for oxidizing agent, a dropping inlet for aqueous sodium hydroxide solution, a pH electrode and a thermometer, 10 g (absolute dry weight) of corn starch, 100 g of deionized water and 0.49 g (3% by mol per anhydrous glucose unit of starch) of $RuCl_3 \cdot nH_2O$ (Ru content: 38% by weight) were charged after weighing. The mixture was cooled with a water bath at 20° C. and, at the time when the inner temperature reached about 20° C., 230 g (6 mol per mol of an anhydrous glucose unit) of an aqueous solution (12% by weight) of Na hypochlorite was added over 3 hours. During the addition, an aqueous 2 N sodium hydroxide solution was added using a pH-stat to control the pH in the system to 9.

After the completion of the addition of Na hypochlorite, stirring was continued for an additional two hours and the reaction mixed solution was slowly poured into about 1 liter of ethanol to precipitate the reaction product. The resulting precipitate was dissolved in 150 ml of deionized water, purified by subjecting to diffusion dialysis using deionized water for 5 days and then freeze-dried to obtain 7.5 g of a powder of Na polycarboxylate.

With respect to the resulting Na polycarboxylate, the carboxyl group content A obtained by the above method was 521 mg and the weight-average molecular weight was 5800.

The Ca ion sequestration capacity (CEC) determined by the following method was 410 mg/g.

Measurement of Ca Ion Sequestration Capacity (CEC)

A Ca solution having a concentration of 100 ppm in terms of $CaCO_3$ was prepared by diluting a standard $CaCl_2$ solution having a concentration of 0.1 mol/liter (manufactured by Orion Research Co.). On the other hand, the polycarboxylic acid to be tested was dissolved in deionized water to prepare an aqueous solution wherein the concentration of Na polycarboxylate was precisely 1% by weight, which was taken as a test solution.

After weighing 100 ml of the Ca solution, 2 ml of a KCl solution having a concentration of 4 mol/liter was added and the pH of the solution was adjusted to 10 by using $1/10$ N NaOH. An initial concentration of the Ca ion was measured with stirring this aqueous solution using a Ca ion electrode. After 2 ml of the test solution was precisely added and the pH was adjusted again to 10, the Ca ion concentration was measured by using a Ca ion electrode. The amount obtained by subtracting the Ca ion concentration after the addition of the test solution from the initial concentration of the Ca ion was taken as the amount of Ca ion chelated. The amount of the Ca ion chelated by 1 g of Na polycarboxylate was taken as an amount (mg) of $CaCO_3$.

Example 2

In the same separable flask (volume: 500 ml) as that used in Example 1, 10 g (absolute dry weight) of corn starch, 50 g of deionized water and 0.16 g (1% by mol per anhydrous glucose unit of starch) of $RuCl_3 \cdot nH_2O$ (Ru content: 38% by weight) were charged after weighing. The mixture was cooled with a water bath at 20° C. and, at the time when the inner temperature reached about 20° C., 192 g (5 mol per mol of an anhydrous glucose unit) of an aqueous Na hypochlorite solution (12% by weight) was added over 5 hours. During the addition, an aqueous 2 N sodium hydroxide solution was added using a pH-stat to control the pH in the system to 10.

After the completion of the addition of Na hypochlorite, stirring was continued for an additional two hours and then 7.8 g of Na polycarboxylate was obtained in the same manner as that described in Example 1.

The carboxyl group content A in the resulting Na polycarboxylate was 489 mg, the weight-average molecular weight was 8100, and CEC was 402 mg/g.

Comparative Example 1

3 g of Na polycarboxylate obtained in Example 2 was dissolved in 50 g of deionized water and, after the pH was adjusted to 3.0 by using 1 N hydrochloric acid, the solution was hydrolyzed with heating in a hot water bath at 80° C. while stirring using a magnetic stirrer for 2 hours. After cooling to room temperature, the pH was adjusted to 10 by using 1 N NaOH and the resultant solution was poured into 500 ml of ethanol. The resulting precipitate was dissolved in 30 ml of deionized water, subjected to diffusion dialysis using deionized water for 5 days and then freeze-dried to obtain 1.1 g of hydrolyzed Na polycarboxylate.

The carboxyl group content A in this hydrolyzed Na polycarboxylate was 486 mg, but the weight-average molecular weight was reduced to 1200 and CEC was also reduced to 280 mg/g.

Example 3

In the same manner as in Example 1 except for using 0.47 g (3% by mol per an anhydrous glucose unit of starch) of osmium tetraoxide in place of $RuCl_3 \cdot nH_2O$ (Ru content: 38% by weight), 6.8 g of Na polycarboxylate was obtained. The carboxyl group content A of the resulting Na polycarboxylate was 458 mg and the weight-average molecular weight was 4200. CEC was 340 mg/g.

Example 4

In the same manner as in Example 1, except for using 10 g a cellulose powder (reagent) in place of corn starch, 8.2 g of Na polycarboxylate was obtained. The carboxyl group content A of the resulting Na polycarboxylate was 440 mg and the weight-average molecular weight was 6200. CEC was 365 mg/g.

Examples 5 to 9

In the same manner as described in Example 1, except for varying the reaction conditions such as, type of polysaccharides, type of catalyst, amount of Na hypochlorite (NaClO) and pH during the reaction, Na polycarboxylate was obtained.

The Ru content of a carbon-carrying Ru shown in Table 1 is 5% by weight, and each of the amount of the catalyst and amount of NaClO used is an amount per anhydrous glucose unit of polysaccharides.

TABLE 1

| | Item | | | | |
|---|---|---|---|---|---|
| | Example 5 | Example 6 | Example 7 | Example 8 | Example 9 |
| Reaction conditions | | | | | |
| Kind of polysaccharides | Corn starch | Wheat starch | Amylopectin | Corn starch | Corn starch |
| Kind of catalyst | $RuCl_3$ | $RuCl_3$ | Carbon-carrying Ru | $RuCl_3$ | $RuO_2$ |
| Catalyst amount (% by mol) | 5 | 7 | 1 | 0.5 | 0.5 |
| NaClO (mol) | 6 | 9 | 6 | 5 | 5 |
| pH | 11 | 10 | 8 | 7 | 9 |
| Temperature (° C.) | 20 | 20 | 20 | 30 | 20 |
| Yield (g) | 7.8 | 7.4 | 8.3 | 8.1 | 7.9 |
| Property | | | | | |
| Carboxyl group content A (mg) | 551 | 558 | 514 | 488 | 451 |
| Weight-average molecular weight | 4300 | 2800 | 6200 | 3800 | 12500 |
| Performance | | | | | |
| CEC ($mgCaCO_3$/g) | 425 | 408 | 412 | 397 | 389 |

Example 10

In the same separable flask (volume: 500 ml) as that used in Example 1, 10 g (absolute dry weight) of corn starch and 90 g of deionized water were charged. Thereafter, the separable flask was put in a constant temperature bath at 20° C. and corn starch was dispersed by stirring. Then, 0.49 g (3% by mol per an anhydrous glucose unit of starch) of $RuCl_3 \cdot nH_2O$ (Ru content: 38% by weight) was added, followed by stirring. At the time when the inner temperature reached about 20° C., 213 g (6 mol per mol of an anhydrous glucose unit) of an aqueous Na hypochlorite solution (13% by weight) was added dropwise for 6 hours, continuously. During the dropwise addition, an aqueous 2 N sodium hydroxide solution was added dropwise using a pH-stat to control the pH in the system to 8.

After the completion of the dropwise addition of the aqueous sodium hypochlorite solution, the concentration of the residual sodium hypochlorite was measured. As a result, it was found to be 1% by weight. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 7.2 g of a powder of sodium polycarboxylate.

The carboxyl group content A of the resulting sodium polycarboxylate was 500 mg and the weight-average molecular weight was 4000. The color was pale blue.

In the same manner as that described in the above test, except for using no sodium sulfite, 7.5 g of a powder of sodium polycarboxylate was obtained. The carboxyl group content A of the product obtained by the above method was 500 mg and the weight-average molecular weight was 4000. The color of the powder was black.

Example 11

The same procedure as that described in Example 10 was repeated, except that the amount of sodium sulfite was changed. The results are shown in Table 2.

TABLE 2

| Sodium sulfite (mol per mol of oxidizing agent) | 0.5 | 2 | 5 |
|---|---|---|---|
| Carboxyl group content A (mg) | 500 | 500 | 500 |
| Weight-average molecular weight | 4000 | 4000 | 4000 |
| Color tone of powder | Bluish green | Nearly colorless | Nearly colorless |

Example 12

In the same manner as described in Example 10, except for changing the amount of $RuCl_3.nH_2O$ (Ru content: 38% by weight) to 0.05 g (0.3% by mol per anhydrous glucose unit of starch), the reaction was performed.

After the completion of the dropwise addition of the aqueous sodium hypochlorite solution, the concentration of the residual sodium hypochlorite was 1.3%. Then, sodium sulfite was added in a one-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain 5.2 g of a powder of sodium polycarboxylate.

The carboxyl group content A of the resulting sodium polycarboxylate was 450 mg and the weight-average molecular weight was 2500. The color was pale yellow.

Exampel 13

In the same manner as described in Example 10, except for changing the amount of $RuCl_3.nH_2O$ (Ru content: 38% by weight) to 1.6 g (10% by mol per anhydrous glucose unit of starch), the reaction was performed.

After the completion of the dropwise addition of the aqueous sodium hypochlorite solution, the concentration of the residual sodium hypochlorite was 1.2%. Then, sodium sulfite was added in a two-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the resulting precipitate was purified by using an ultrafiltration device and then freeze-dried to obtain 5.2 g of a powder of sodium polycarboxylate.

The carboxyl group content A of the resulting sodium polycarboxylate was 520 mg and the weight-average molecular weight was 4000. The color was pale blue.

Example 14

In the same separable flask (volume: 500 ml) as that used in Example 1, 10 g (absolute dry weight) of corn starch and 90 g of deionized water were charged. Thereafter, the separable flask was put in a constant temperature bath at 20° C. and corn starch was dispersed by stirring. Then, 0.16 g (1% by mol per an anhydrous glucose unit of starch) of $RuCl_3.nH_2O$ (Ru content: 38% by weight) was added, followed by stirring. At the time when the inner temperature reached about 20° C., 213 g (6 mol per mol of an anhydrous glucose unit) of an aqueous Na hypochlorite solution (13% by weight) was added dropwise for 3 hours, continuously. During the dropwise addition, an aqueous 2 N sodium hydroxide solution was added dropwise using a pH-stat to control the pH in the system to 10.

After the completion of the dropwise addition of the aqueous sodium hypochlorite solution, the concentration of the residual sodium hypochlorite was measured. As a result, it was found to be 0.5% by weight. Then, a reducing agent shown in Table 3 was added in a five-fold molar amount based on the residual sodium hypochlorite and then dissolved by stirring. After the dissolution, the solution was allowed to stand to form a precipitate. After the formed precipitate was removed by filtration (pore diameter of filter: 0.1 um), the filtrate was slowly poured into a two-fold amount of ethanol to precipitate the reaction product. The resulting precipitate was dissolved in 100 ml of deionized water, purified by subjecting to diffusion dialysis using deionized water for 5 days and then freeze-dried to obtain a powder of sodium polycarboxylate. The results are shown in Table 3.

TABLE 3

| | Reducing agent | |
|---|---|---|
| | Sodium sulfite | Na dithionite (Hydrosulfite) |
| Carboxyl group content A (mg) | 460 | 460 |
| Weight-average molecular weight | 3000 | 3000 |
| Color tone of powder | Pale blue | Pale yellow |

Example 15

In the same manner as in Example 10, except for changing the reaction conditions as shown in Table 4, the reaction was performed. After the completion of the dropwise addition of an aqueous sodium hypochlorite solution, the amount of the residual sodium hypochlorite was measured and then sodium sulfite was added in an amount of 2 mol per mol of the residual sodium hypochlorite. The results are shown in Table 4.

TABLE 4

| | Test No. | | | | | | | |
|---|---|---|---|---|---|---|---|---|
| | 1 | 2 | 3 | 4 | 5 | 6 | 7 | 8 |
| Kind of polysaccharides | Corn starch | Tapioca starch | Potato starch | Wheat starch | Soluble starch | Amylopectin | Cellulose powder | Corn starch |
| Kind of catalyst | $RuCl_3$ | $RuCl_3$ | $RuCl_3$ | $RuCl_3$ | $RuCl_3$ | Carbon-carrying Ru | $RuCl_3$ | None |
| Catalyst amount (% by mol)* | 3 | 3 | 5 | 1 | 3 | 0.5 | 3 | 0 |
| Sodium hypochlorite amount (mol)** | 3 | 6 | 6 | 12 | 5 | 6 | 6 | 6 |
| Time of sodium hypochlorite to be added (hour) | 3 | 6 | 18 | 6 | 5 | 1.5 | 3 | 3 |
| Reaction temperature (° C.) | 20 | 20 | 20 | 40 | 5 | 20 | 20 | 20 |
| Reaction pH | 9 | 12 | 6 | 9 | 8 | 8 | 10 | 9 |
| Carboxyl group content A (mg) | 513 | 517 | 537 | 517 | 501 | 450 | 460 | 312 |
| Weight-average molecular weight | 3300 | 4200 | 6600 | 2700 | 3500 | 3600 | 5500 | 5000 |
| Color tone of powder | Pale blue | Pale blue | Pale yellow | Pale blue | Pale blue | Pale yellow | Pale blue | Colorless |

*per anhydrous glucose unit
**per mol of anhydrous glucose unit

Example 16

In the same manner as in Example 10, except for using 0.47 g (3% by mol per an anhydrous glucose unit of starch) of osmium tetraoxide in place of $RuCl_3.nH_2O$, 6 g of sodium polycarboxylate was obtained. The carboxyl group content A of the resulting sodium polycarboxylate was 450 mg. The weight-average molecular weight was 3800 and the color of the powder was pale yellow.

According to the present invention, there can be obtained a polycarboxylate acid having high carboxyl group content and high molecular weight, or a salt thereof, in good yield.

The polycarboxylic acid of the present invention or salt thereof can be used as a dispersant, a chelating agent or a flocculant. Since the carboxyl group content is high and the chelation capacity for polyhydric cations such as Ca, Mg, etc. is large, the polycarboxylic acid or salt thereof is particularly suitable as a builder for detergent or a scum inhibitor.

What is claimed is:

1. A method for producing a polycarboxylic acid or a salt thereof, wherein the polycarboxylic acid contains, in its acid form, carboxylic acid groups in a number requiring an amount of alkali for neutralization of its acid form not less than 435 mg in terms of sodium hydroxide per 1 g of the polycarboxylic acid and the weight-average molecular weight of said polycarboxylic acid is not less than 2000, comprising oxidizing a polysaccharide containing anhydrous glucose as a constituent unit in the presence of a transition metal catalyst, using an oxidizing agent selected from the group consisting of hypohalites, bleaching powder, perhalites, persulfates and peracetates, said transition metal catalyst containing at least one member selected from the group consisting of Ru, Os, Tr, Pt, Pd and oxides and salts thereof.

2. A method according to claim 1 wherein said transition metal catalyst contains at least one member selected from the group consisting of Ru and Os and oxides and salts thereof.

* * * * *